T. R. CLARK.
STATION INDICATOR.
APPLICATION FILED MAY 1, 1908.
912,992.
Patented Feb. 23, 1909.
4 SHEETS—SHEET 2.
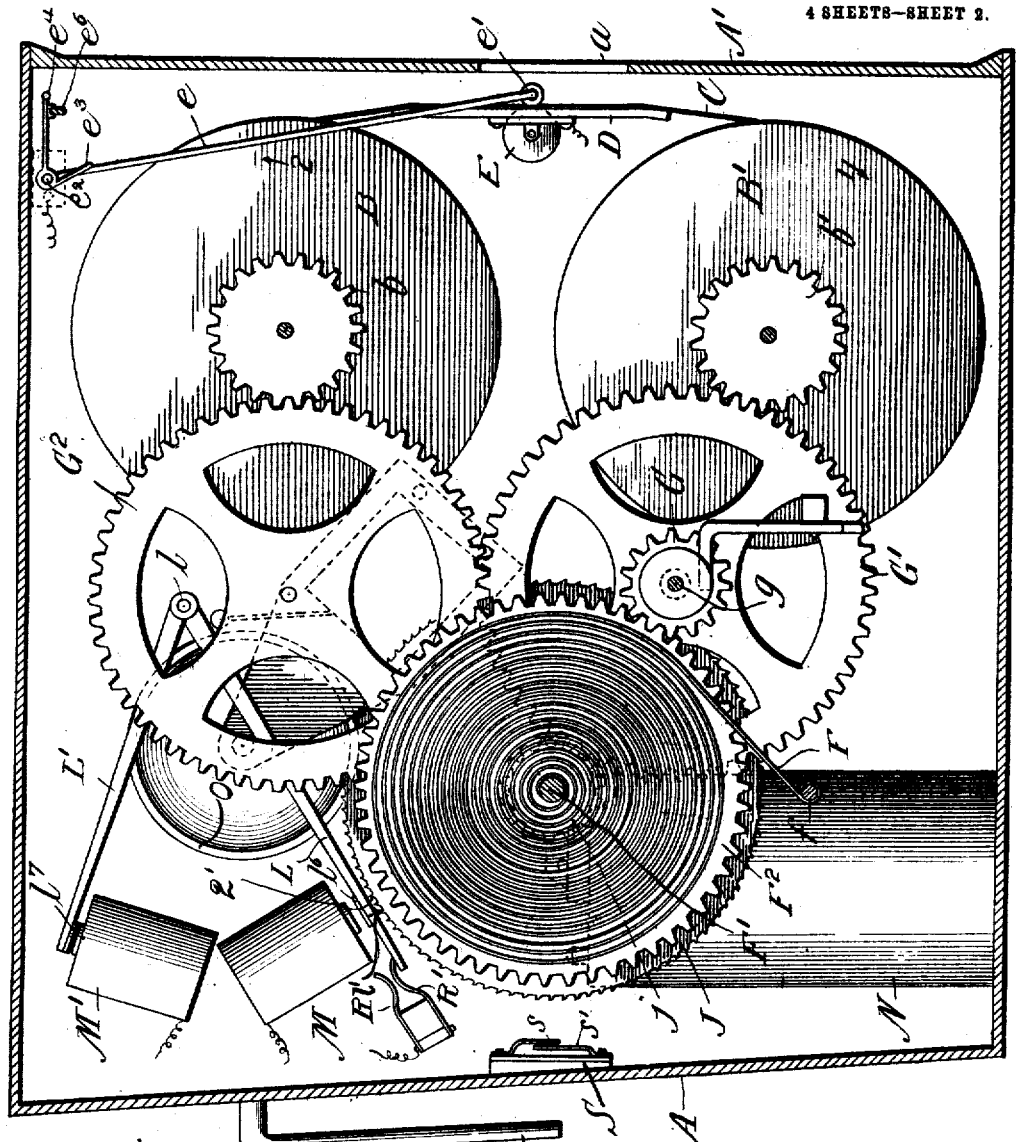
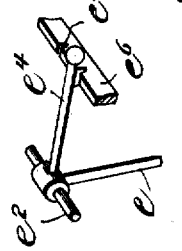

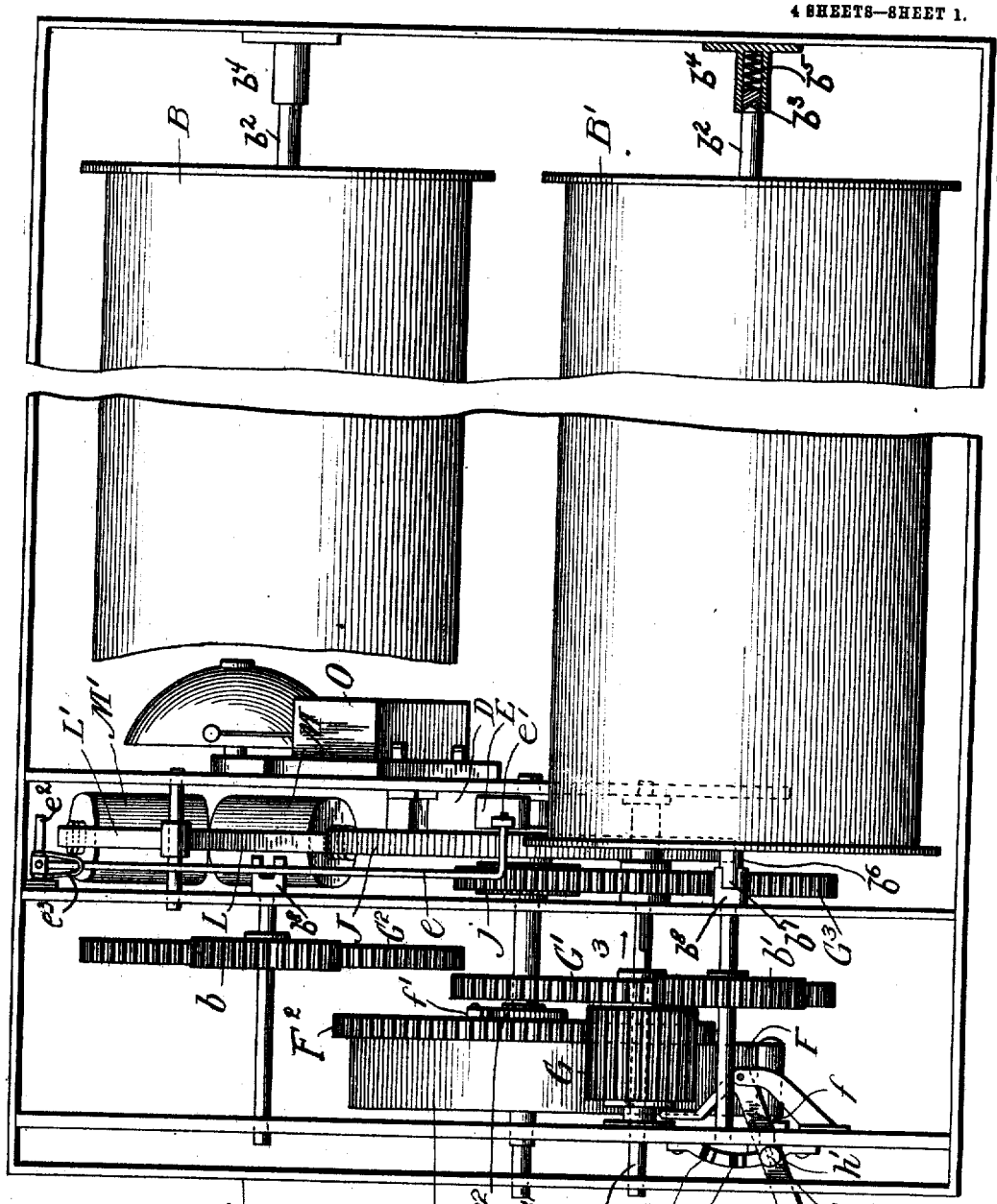

T. R. CLARK.
STATION INDICATOR.
APPLICATION FILED MAY 1, 1908.
912,992.
Patented Feb. 23, 1909.
4 SHEETS—SHEET 4.
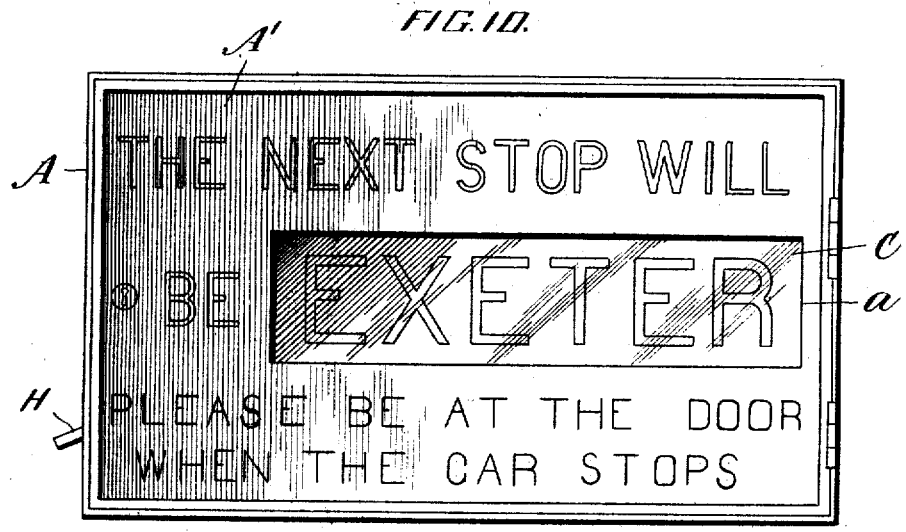
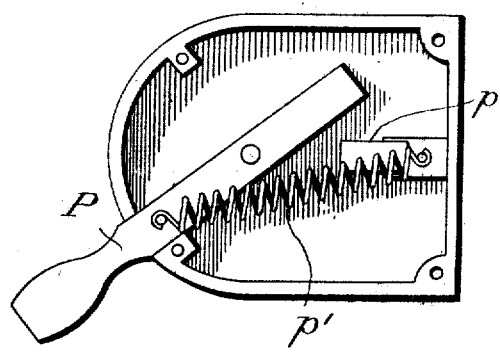
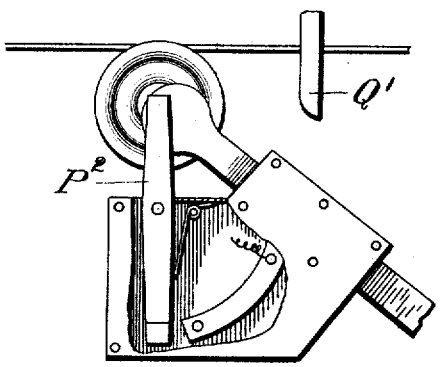
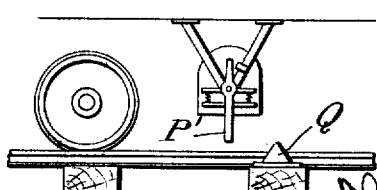

UNITED STATES PATENT OFFICE.

THOMAS ROY CLARK, OF BRADFORD, PENNSYLVANIA.

STATION-INDICATOR.

No. 912,992.  Specification of Letters Patent.  Patented Feb. 23, 1909.

Application filed May 1, 1908. Serial No. 430,355.

*To all whom it may concern:*

Be it known that I, THOMAS ROY CLARK, citizen of the United States, residing at Bradford, in the county of McKean and State of Pennsylvania, have invented certain new and useful Improvements in Station-Indicators; and I do hereby declare the following to be a full, clear, and exact description of the invention, such as will enable others skilled in the art to which it appertains to make and use the same.

My invention consists in the novel features hereinafter described reference being had to the accompanying drawings which illustrate one form in which I have contemplated embodying my invention and said invention is fully disclosed in the following description and claims.

Figure 3:
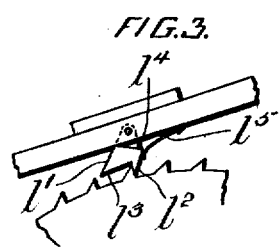
Figure 4:
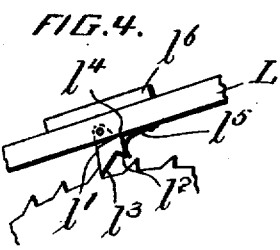
Figure 5:
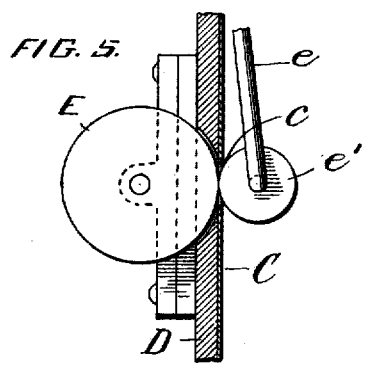
Figure 6:
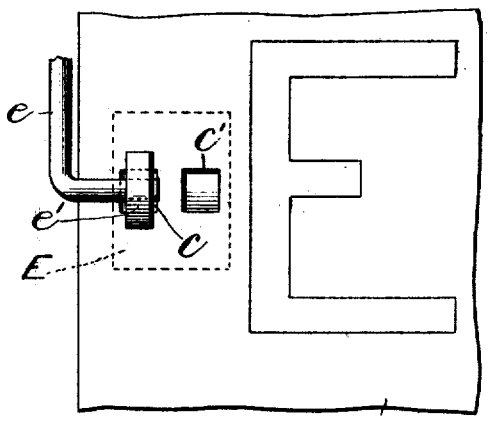
Figure 7:
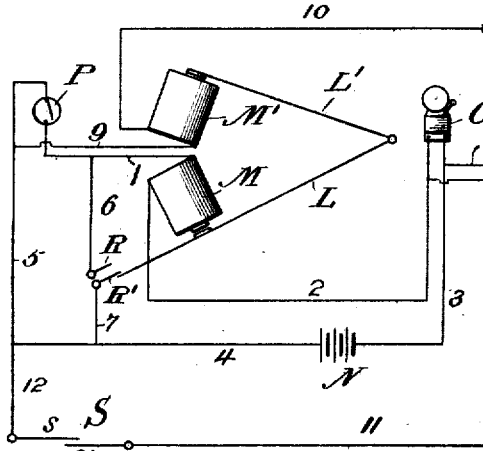
Figure 8:
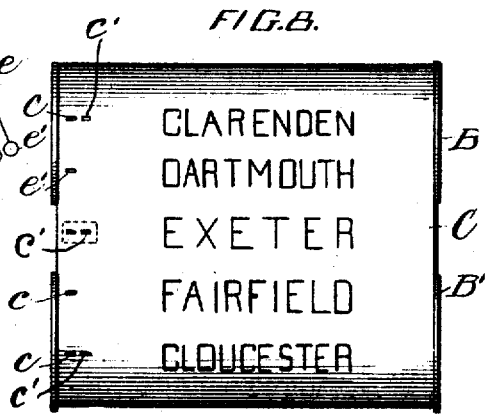
Figure 9:

Referring to the drawings, Figure 1 represents a front elevation of an indicator embodying my invention with the front plate and indicator web removed, and the winding rolls partly broken away. Fig. 2 is a side elevation of the apparatus with the supporting frame plates omitted for greater clearness in showing the working parts. Fig. 2ª is a detail of the device for shifting one of the web engaging contacts. Fig. 3 is an enlarged detail view of the ratchet wheel and detent for stopping the motor. Fig. 4 is a similar view showing the parts in the positions occupied when the ratchet wheel is at rest. Fig. 5 is a detail sectional view showing the web engaging contacts, and a portion of the indicator web, drawn to an enlarged scale. Fig. 6 is a detail elevation of the same. Fig. 7 is a diagrammatic view showing the electric circuits employed. Fig. 8 is a front view of the winding rolls and indicator web drawn to a reduced scale. Fig. 9 is a detail sectional view of a portion of the web showing a modification of the means for making the circuit through the web engaging contacts. Fig. 10 is a front view of the apparatus drawn to a reduced scale. Fig. 11 is a detail view of a hand operated switch for controlling the apparatus. Fig. 12 is a detail view of an automatic switch for the same purpose carried by the trolley pole. Fig. 13 is a detail view of another form of automatic switch, carried by the car adjacent to the road bed.

In the drawing A represents an inclosing casing having a front plate A' which is preferably hinged thereto and may be provided with a suitable lock or fastening device. The front plate A' is provided with a horizontal slot or aperture $a$ (see Fig. 10) which is of sufficient size to permit the name of a station printed on a traveling web to show through the same. The front plate may be ornamented or provided with suitable lettering, as indicated in the drawing.

Within the casing A are a pair of winding rolls or drums B, B' mounted preferably one above the other, and carrying a flexible web C of paper, cloth, or other suitable material on which are printed the names of the several stations in the order in which they are located along the line of the roadway, as indicated in Fig. 8.

Between the rolls B, B' and in rear of the slot $a$ in the front of the casing I preferably provide a vertically disposed plate D, over which the web C passes, in order to hold it firmly; and adjacent to the path of the web, I provide a metallic contact, in this instance in the form of a roller E mounted on the rear of plate D and projecting through an aperture in said plate, into contact with the web as shown in Fig. 2.

$e$ represents a contact arm supported from some part of the casing and having a part (in this instance) which would engage the roller E were it not for the web C which passes between the contacts E and $e'$, as shown in Figs. 2, 5 and 6. The arm $e$ is preferably pivoted to the upper part of the casing on a stud $e^2$, and is provided with a spring $e^3$ which presses the roller $e'$ toward the roller E. I prefer to make the contact roller E of considerably greater width than the outer contact roller $e'$, and to mount the arm $e$ so that it can be moved laterally, into different positions. For example, I have shown in Fig. 2ª the arm $e$ provided with a horizontal locking arm $e^4$ engaging a slot $e^5$ in a plate $e^6$, which holds it in place on the stud $e^2$. The plate $e^6$ is provided in this instance with two slots $e^5$, so that the arm $e$ can be moved on the stud laterally and locked in position in line with either of said slots as shown, and for a purpose hereinafter set forth.

The web C is provided adjacent to each of the names of the several stations with means for making a circuit through the contacts E and $e'$. The simplest means consists of a hole $c$ cut in the web as shown in Fig. 6, and located in such position that it will permit the periphery of roller $e'$ to extend through such hole and into contact with the roller E. I may however employ a metal button as indicated at $c^x$, Fig. 9, having portions on each side of the web and a portion extending therethrough, which would likewise effect the desired result of enabling the two contacts to make a circuit therethrough at intervals along the web. I also prefer in some instances to provide the web with additional apertures $c'$ (Fig. 8) in a different line from the apertures $c$, and located opposite the names of certain stations only, as for example those stations at which express trains or cars stop, the row of perforations $c$ being adapted for use in the case of local trains or cars which stop at every station. The inner contact roll E is of a width sufficient to be in line vertically with both rows of apertures $c$, $c'$, and the contact arm $e$ can as before described, be moved laterally by hand and locked with the contact roll $e'$ in line with either of said rows of apertures. I prefer to employ roller contacts to avoid wear or friction on the web C but obviously other forms of contacts could be employed if preferred.

In order to drive the web I provide a motor, preferably actuated as shown by means of a spring, although other forms of motor could be employed in the device. This spring motor comprises the spring F secured at one end to a stationary bar $f$ and at the other end to the shaft or arbor $F'$ on which is mounted the driving gear wheel $F^2$, connected to the shaft by pawl $f'$ and ratchet $f^2$ in a well known way to permit the spring to be wound without disturbing the train. Gear wheel $F^2$ meshes with a broad faced pinion G, mounted on a shaft $g$, which also carries the large gear wheel $G'$. The shaft $g$ is movable endwise in its bearings together with the pinion G and gear wheel $G'$, and motion can be imparted to either of the winding rolls B, B' in the proper direction to wind up the web C thereon. When the shaft $g$ is in its outer most position as shown in Fig. 1, the gear wheel $G'$ engages the pinion $b'$ on the shaft of the winding roll B', thus driving it in the direction indicated by the arrow 1. When it is desired to reverse the direction of movement of the web the shaft $g$ is moved inward in the direction of the arrow 3 (Fig. 1) by means of a shifting lever H (which projects through the side of the casing for convenience), thereby shifting the gear $G'$ out of engagement with pinion $b'$ and into engagement with a gear wheel $G^2$, which in turn engages a pinion $b$ on the shaft of roller B, and the motor will then drive the roller B in the direction of the arrow 2 in Fig. 2. By shifting the shaft $g$ still further inward the wheel $G'$ can be disengaged from wheel $G^2$ leaving the shafts of both rollers B, B' free and the said rollers can be turned by hand to any desired position. I prefer to provide the lever H with a spring locking pawl $h$, adapted to engage notches $h'$, $h^2$, $h^3$ in a locking segment to hold the lever and shaft $g$ in any of the positions to which they may be adjusted, (see Fig. 1). The shaft $g$ is also provided with a driving wheel $G^3$, which is held in fixed position in the motor frame, and is secured to shaft $g$ by a key or feather as shown, to permit the movement of the shaft therethrough, said gear wheel $G^3$ meshing at all times with a pinion $j$ which is connected rigidly with a ratchet escapement wheel J, both of which are mounted loosely on shaft $f$.

The escapement mechanism includes the ratchet wheel J, and a two armed escapement lever L, L' pivoted at $l$, one arm L, carrying a pivoted pawl $l'$ provided with a short tooth $l^2$ and a long tooth $l^3$, as best shown in Figs. 3 and 4. The pawl $l'$ has a certain amount of movement with respect to lever L and is limited by the engagement of a shoulder or shoulders $l^4$ with the lever, said pawl being provided with a spring $l^5$ which holds it normally in the position shown in Fig. 3. The lever L is provided with an armature $l^6$ which is located in proper relation to the core of an electro magnet, M, so that when the magnet is energized the lever L will be lifted and the pawl $l'$ disengaged from the ratchet wheel J, thus permitting the motor to run. The arm L' of the escapement lever is also provided with an armature $l^7$ in operative relation with a second electro magnet M', which is of greater strength than the magnet M, by reason of its windings, and operates on the levers L, L' in opposition to the magnet M.

N, Fig. 2, represents a battery for energizing the magnets M, M' and O represents an electric bell (Figs. 1 and 2) which is operated whenever the motor is actuated to move the web to bring the name of a station into position to be seen, thus calling the attention of the passengers in the cars to the indicator. The indicator is controlled by means of a trigger switch or other contact device which may be operated by the conductor, or engineer or motorman by hand, or may be operated automatically by means of trips located along the roadway or along the trolley wire in the case of electrically propelled cars.

In Fig. 11 I have shown a hand operated switch for making the circuit through the magnet M and in order to insure having all circuits in normal condition after each operation of the device I prefer to employ a switch which makes and almost instantly breaks the circuit. In this figure the switch comprises the pivoted lever P which is arranged to pass between a pair of normally separated contacts $p$ $p$, and is acted upon by a spring $p'$ which holds the lever at all times in inoperative position with respect to the contacts. When a switch of this type is employed it is necessary to provide means for maintaining a circuit through the magnet M to hold up the detent lever as long as is required to bring the desired station name into view and to this end I provide the contacts R, R' in the circuit of the magnet M adjacent to the lever arm L, said contacts being normally open and one of said contacts (R') being adapted to be struck by lever L and moved into engagement with the contact R, when the magnet M is energized.

The circuits of the device are illustrated diagrammatically in Fig. 7. Circuit No. 1 extends from the switch P by wire 1 to magnet M, thence by wire 2 to the bell O, thence by wire 3 to battery N, thence by wires 4 and 5 to the switch. The contacts R, R' are located in a shunt circuit represented by wires 6 and 7 which cuts out the switch P as soon as the magnet M is energized and causes lever L to bring said contacts together.

Circuit No. 2 extends from the roller E by wire 8 to wire 3, thence to battery, and thence by wires 4, 5 and 9 to magnet M', thence by wire 10 to the contact arm $e$ and small contact roll $e'$.

It will be seen that as soon as the switch P is operated a circuit is closed through magnet M thus lifting the lever L, L' releasing the escapement wheel J, and setting the motor in operation to wind the web C upon one or other of rollers B, B', and also bringing contacts R, R' together cutting out switch P and maintaining the circuit No. 1. The web C passes along between the contacts E, $e'$ holding them separated until one of the apertures $c$ (or $c'$) permits the roller $e'$ to engage roller E when circuit No. 2 is made through the stronger magnet M' and restoring the lever L, L' to its normal position, and simultaneously breaking the circuit No. 1 by permitting contacts R, R' to separate. As the lever arm L descends the short tooth $l^2$ of pawl $l'$ is brought into the path of one of the ratchet teeth, as shown in Fig. 3, but as the said teeth engage, the pawl yields against its spring thereby allowing the engaged ratchet tooth to pass and swinging the long tooth $l^3$ of the pawl into engagement with the next tooth of the ratchet wheel and stopping the wheel and the motor, as soon as the shoulder $l^4$ prevents further movement of the pawl. This additional movement causes the web C to move far enough to bring a portion of the web between the rollers E, $e'$ and separate the said contacts thus breaking circuit No. 2 and leaving all parts in normal condition ready for another operation of the indicator when the next station is approached.

In order to prevent the apparatus from being put out of operation by the running down of the motor spring, I provide a switch S (see Fig. 2) having contacts $s$ $s$ normally separated, and connected by wires 11 and 12 with wires 2 and 4 so as to make a circuit through the battery N and bell O only when said contacts are brought together. This switch S is located in such a position that the contact $s$ is in the path of the outer coil of spring F, and will be engaged thereby when the spring is nearly unwound thus making the circuit through the bell which by its continuous ringing will indicate that the spring needs rewinding.

It is obvious that if the car is being used on an express run, the contact arm $e$ will be moved inward to bring roller $e'$ in line with the row of apertures $c'$ (see Fig. 8) thereby causing the indicator to arrest the web only at the names of express stations.

In Fig. 12, I have shown a form of switch $P^2$, adapted to be carried by the trolley arm and to engage trips Q' arranged on the trolley wire or the supports therefor, in advance of stations. In Fig. 13, I have shown a switch P' located beneath the car in position to strike projections or trips Q located along the road bed in advance of the stations.

In placing the indicator in a car the casing A is conveniently supported by means of a hook $A^2$ (see Fig. 2) or other means, and the electrical connection with the circuit closer is made by means of a push plug (not shown) in the usual manner. In cars having the seats extending longitudinally, it will not be necessary to change the location of the indicator in the car, but where the seats extend transversely and the car is reversed at the end of the route, the indicator is preferably removed from its support and moved to the opposite end of the car, and the electric connection established by means of the plug, the car in such case being wired suitably for this purpose. I also prefer to mount the rollers B, B' removably in the indicator, in order that different strips may be supplied quickly and conveniently if desired. I have shown each of the rollers B, B' provided at one end with a gudgeon or spindle $b^2$ having a conical end to engage a slidable cone bearing block $b^3$ supported in a sleeve $b^4$ secured to the casing and provided with a spring $b^5$ in rear of the block $b^3$, and at the other end with a gudgeon or spindle $b^6$, having a flat key portion $b^7$ adapted to enter a notched or recessed head $b^8$, carried by the shaft of its driving pinion $b$ or $b'$. This construction enables the rolls to be quickly inserted or removed by pressing them endwise against the springs $b^5$, as will be readily understood.

What I claim and desire to secure by Letters Patent is:—

1. In an indicator, the combination with an indicating web, of a motor for operating said web, to bring the indications thereof into view, controlling mechanism for said motor including an electric circuit, an electro magnet therein, contacts in said circuit, having portions located on the opposite faces of said web, said web being provided with a plurality of rows of devices arranged longitudinally of the web for completing the circuit through said contacts and means for bringing said contacts into operative relation with the devices in one or other of said rows, substantially as described.

2. In an indicator, the combination with an indicating web, of a motor for operating said web, to bring the indications thereof into view, controlling mechanism for said motor including an electric circuit, an electro magnet therein, contacts in said circuit, having portions located on the opposite faces of said web, said web being provided with a plurality of rows of devices arranged longitudinally of the web for completing the circuit through said contacts, and means for shifting one of said contacts transversely with respect to said web to bring it into alinement with one or other of said longitudinal rows of devices, substantially as described.

3. In an indicator, the combination with a longitudinally movable indicating web, of operating and controlling mechanism therefor, including an electric circuit, a magnet located therein, contacts in said circuit, located on opposite sides of and normally separated by said web, said web being provided with a plurality of longitudinal rows of apertures, each adapted to permit the engagement of said contacts therethrough, and means for shifting one of said contacts into line with either of said rows of apertures, substantially as described.

4. In an indicator, the combination with a movable web, of a motor, means for operatively connecting said motor with said web for driving it, a ratchet wheel, operated by said motor, a detent lever adjacent thereto, a yielding pawl pivotally connected to said lever provided with a plurality of teeth for engaging teeth of the ratchet wheel, and means for moving said pawl into and out of engagement with said ratchet wheel, substantially as described.

5. In an indicator, the combination with a movable indicating web, of a motor for operating the same, controlling means for said motor including a ratchet wheel operatively connected with the motor, a yielding detent pawl having a short tooth, and a long arresting tooth, means for holding the pawl in such position that the short tooth only is in position to be moved into engagement with the teeth of the ratchet wheel, when out of engagement therewith, substantially as described.

6. In an indicator, the combination with a movable indicating web, and means for causing the travel of the same, of a pair of normally separated contacts located on opposite faces of said web, the said web being provided at intervals with means for permitting the circuit to be made through said contacts, an electric circuit including said contacts, an electro magnet in said circuit, and an arresting device for the web actuating means, operated by said magnet, and constructed to permit a slight movement of the web after it is brought into operation to permit the separation of the said contacts by said web, substantially as described.

7. In an indicator, the combination with an indicating web and actuating mechanism therefor, of means for arresting said actuating mechanism, comprising a ratchet wheel operated by said actuating mechanism, and a yielding detent pawl adapted to be moved into and out of operative relation therewith, an electro magnet for moving said pawl into engagement with the ratchet wheel, an electric circuit for said magnet, a pair of contacts having portions located on opposite faces of said web and normally separated thereby, said web being provided with a series of apertures for permitting the engagement of said contacts therethrough, said yielding pawl permitting a slight movement of the web after the pawl is moved into engagement with the ratchet wheel, to bring a portion of the web adjacent to one of said apertures between said contacts, substantially as described.

8. In an indicator, the combination with the movable indicator web, and means for actuating the same, of a detent for arresting said actuating means, means for disengaging said detent, including an electro magnet, an electric circuit therefor, a switch in said circuit, a pair of normally separated contacts in a shunt of said circuit for short circuiting said switch, and means for closing said contacts when the magnet is energized, substantially as described.

9. In an indicator, the combination with the movable indicator web and means for actuating the same, of a detent lever, provided with means for arresting the said actuating means, an electro magnet for operating said lever to release said actuating mechanism, a circuit for said magnet, a switch in said circuit, a pair of normally separated contacts in a shunt of said circuit for short circuiting said switch, one of said contacts having a part in the path of said lever for closing the shunt circuit when the lever is operated by said magnet, substantially as described.

10. In an indicator, the combination with the movable indicator web and means for actuating the same, of a detent lever, provided with means for arresting the said actuating means, an electro magnet for operating said lever to release said actuating mechanism, a circuit for said magnet, a switch in said circuit, a pair of normally separated contacts in a shunt of said circuit for short circuiting said switch, one of said contacts having a part in the path of said lever for closing the shunt circuit when the lever is operated by said magnet, a second magnet for moving said lever in a direction to cause it to arrest said actuating mechanism, an electric circuit for said second circuit, and a pair of contacts having portions on opposite faces of said web and normally separated thereby, said web being provided at intervals with means for permitting the circuit through said second magnet to be established through the said contacts, substantially as described.

11. In an indicator, the combination with the movable indicating web, an actuating means therefor, of controlling mechanism for said actuating means comprising a rotary part actuated thereby, a detent for arresting said rotary part, a magnet for moving said detent in a direction to release said rotary part, a circuit for said magnet, a controlling switch in said circuit, a second magnet of greater strength than the first magnet, for moving the detent in a direction to arrest said rotary part, a circuit for said second magnet and automatic means operated by the travel of the web for closing the circuit through said second magnet, substantially as described.

12. In an indicator, the combination with the movable indicating web, and actuating means therefor, of controlling mechanism for said actuating means comprising a rotary part actuated thereby, a detent for arresting said rotary part, a magnet for moving said detent in a direction to release said rotary part, a circuit for said magnet, a controlling switch in said circuit, a pair of normally separated contacts in a shunt of said circuit for short circuiting said controlling switch, means operated by said magnet for bringing said contacts together, a second magnet of greater strength than the first magnet for moving the detent in a direction to arrest said rotary part, a circuit for said second magnet, and means operated automatically by the travel of said web for closing the circuit through said second magnet, substantially as described.

13. In an indicator, the combination with a flexible indicating web, of winding rollers connected therewith, a spring motor, gear connections for driving one or the other of said winding rollers, a reversing lever for throwing one or the other of said rollers into operative connection with said web, an escapement ratchet connected with said motor, a two armed escapement lever, an electro magnet adjacent to each arm of said lever for operating the lever in opposite directions, a yielding detent pawl pivoted on one of said lever arms provided with two teeth for engaging the ratchet wheel, a circuit for one of said magnets, for moving the escapement lever in a direction to release the escapement wheel, including a switch and a pair of normally separated contacts, one of which is in the path of and adapted to be moved by said lever to close the circuit therethrough and cut out said switch, a second circuit through the other magnet, a pair of separated contacts in said second circuit, located on opposite sides of the web, said web being provided at intervals with means for causing the closing of said second circuit through said contacts, to bring one of the teeth of the detent pawl in engagement with the ratchet wheel, substantially as described.

In testimony whereof I affix my signature, in the presence of two witnesses.

THOMAS ROY CLARK.

Witnesses:
Thos. B. Wilson,
Genevieve Clark Hanna.